(12) United States Patent
Kronschläger et al.

(10) Patent No.: US 11,955,729 B2
(45) Date of Patent: Apr. 9, 2024

(54) ANTENNA SYSTEM AND METHOD FOR OPERATING AN ANTENNA

(71) Applicant: NXP B.V., Eindhoven (NL)

(72) Inventors: Oliver Kronschläger, Vienna (AT); David Knabl, Hitzendorf (AT); Andreas Merl, Graz (AT); Michael Stark, Gleisdorf (AT); Erich Merlin, Gratkorn (AT)

(73) Assignee: NXP B.V., Eindhoven (NL)

( * ) Notice: Subject to any disclaimer, the term of this patent is extended or adjusted under 35 U.S.C. 154(b) by 84 days.

(21) Appl. No.: 17/705,221

(22) Filed: Mar. 25, 2022

(65) Prior Publication Data

US 2023/0307837 A1  Sep. 28, 2023

(51) Int. Cl.
  *H01Q 7/08* (2006.01)
(52) U.S. Cl.
  CPC .................................... *H01Q 7/08* (2013.01)
(58) Field of Classification Search
  CPC .............................. H01Q 7/08; H01Q 1/2208
  See application file for complete search history.

(56) References Cited

U.S. PATENT DOCUMENTS

| | | | |
|---|---|---|---|
| 2010/0131033 A1* | 5/2010 | Cantatore | H01Q 1/2225 607/60 |
| 2013/0005251 A1 | 1/2013 | Soar | |
| 2014/0159848 A1 | 6/2014 | Konanur et al. | |
| 2017/0353061 A1 | 12/2017 | Maniktala | |

FOREIGN PATENT DOCUMENTS

| | | | |
|---|---|---|---|
| JP | 2000091841 A | * | 3/2000 |
| JP | 2000183632 A | * | 6/2000 |
| WO | 2020/092026 A1 | | 5/2020 |

* cited by examiner

*Primary Examiner* — Dieu Hien T Duong (57) ABSTRACT

Embodiments of an antenna system and a method for operating an antenna are disclosed. In an embodiment, an antenna system includes a first ferrite element, a second ferrite element, a first coil wrapped around the first ferrite element, a second coil wrapped around the second ferrite element, a first antenna interface electrically coupled to the first coil, a second antenna interface electrically coupled to the second coil, and a conductor network connected between the first coil, the second coil, the first antenna interface, and the second antenna interface.

13 Claims, 10 Drawing Sheets

ANTENNA SYSTEM AND METHOD FOR OPERATING AN ANTENNA

BACKGROUND

In electronic devices, antenna systems may be used to enable near-field communication (NFC) and/or wireless power transfer (e.g., wireless charging). As an example, an antenna system of a transmitting device (e.g., transmitting antenna system) may be coupled with an antenna system of a receiving device (e.g., receiving antenna system) to transfer data and/or power via radio frequency (RF) fields. In order for conventional antenna systems to enable NFC-based communications and/or wireless charging, the transmitting antenna system and the receiving antenna system typically need to adhere to stringent housing conditions and/or have the same antenna structure (e.g., the same coil arrangement). As such, implementation and interoperability of conventional antenna systems can be a limiting factor in wireless systems.

SUMMARY

Embodiments of an antenna system and a method for operating an antenna are disclosed. In an embodiment, an antenna system includes a first ferrite element, a second ferrite element, a first coil wrapped around the first ferrite element, a second coil wrapped around the second ferrite element, a first antenna interface electrically coupled to the first coil, a second antenna interface electrically coupled to the second coil, and a conductor network connected between the first coil, the second coil, the first antenna interface, and the second antenna interface.

In an embodiment, the first and second ferrite elements are configured end-to-end relative to each other, and wherein the conductor network includes a first node that connects an inner end of the first coil and an inner end of the second coil, and a second node that connects an outer end of the first coil and an outer end of the second coil.

In an embodiment, the first and second ferrite elements are configured end-to-end relative to each other, and wherein the conductor network includes a first node that connects an outer end of the first coil and an inner end of the second coil, and a second node that connects an inner end of the first coil and an outer end of the second coil.

In an embodiment, the first ferrite element and the second ferrite element are aligned along an axis.

In an embodiment, the first ferrite element and the second ferrite element are angled relative to an axis.

In an embodiment, a first current is provided to the first coil, a second current is provided to the second coil, and wherein the first current and the second current flow in opposite directions.

In an embodiment, a first current is provided to the first coil, a second current is provided to the second coil, and wherein the first current and the second current flow in the same direction.

In an embodiment, a first radio frequency (RF) field is produced by a first current provided to the first coil, and a second RF field is produced by a second current provided to the second coil.

In an embodiment, the first RF field and the second RF field are emitted outwards between the first ferrite element and the second ferrite element.

In an embodiment, the first RF field and the second RF field are emitted along an axis.

A system is also disclosed. The system includes an antenna system including a first ferrite element, a second ferrite element, a first coil wrapped around the first ferrite element, a second coil wrapped around the second ferrite element, a first antenna interface electrically coupled to the first coil, a second antenna interface electrically coupled to the second coil, and a conductor network connected between the first coil, the second coil, the first antenna interface, and the second antenna interface, and a transmit circuit connected to the conductor network through the first antenna interface and the second antenna interface, wherein the transmit circuit is configured to provide a first current to the first coil and a second current to the second coil.

In an embodiment, the first and second ferrite elements are configured end-to-end relative to each other, and wherein the conductor network includes a first node that connects an inner end of the first coil and an inner end of the second coil, and a second node that connects an outer end of the first coil and an outer end of the second coil.

In an embodiment, the first and second ferrite elements are configured end-to-end relative to each other, and wherein the conductor network includes a first node that connects an outer end of the first coil and an inner end of the second coil, and a second node that connects an inner end of the first coil and an outer end of the second coil.

In an embodiment, the first ferrite element and the second ferrite element are aligned along an axis.

In an embodiment, the first ferrite element and the second ferrite element are angled relative to an axis.

In an embodiment, the first current and the second current flow in opposite directions.

In an embodiment, the first current and the second current flow in the same direction.

In an embodiment, a first RF field is produced by the first current, and a second RF field is produced by the second current.

In an embodiment, the first RF field and the second RF field are emitted outwards between the first ferrite element and the second ferrite element.

A method for operating an antenna system is also disclosed. The method involves providing a first current to a conductor network via a first antenna interface, providing a second current to the conductor network via a second antenna interface, and wherein the conductor network electrically connects the first and second antenna interfaces to a first coil wrapped around a first ferrite element and to a second coil wrapped around a second ferrite element.

Other aspects in accordance with the invention will become apparent from the following detailed description, taken in conjunction with the accompanying drawings, illustrated by way of example of the principles of the invention.

BRIEF DESCRIPTION OF THE DRAWINGS

Throughout the description, similar reference numbers may be used to identify similar elements.

DETAILED DESCRIPTION

It will be readily understood that the components of the embodiments as generally described herein and illustrated in the appended figures could be arranged and designed in a wide variety of different configurations. Thus, the following more detailed description of various embodiments, as represented in the figures, is not intended to limit the scope of the present disclosure, but is merely representative of various embodiments. While the various aspects of the embodiments are presented in drawings, the drawings are not necessarily drawn to scale unless specifically indicated.

The present invention may be embodied in other specific forms without departing from its spirit or essential characteristics. The described embodiments are to be considered in all respects only as illustrative and not restrictive. The scope of the invention is, therefore, indicated by the appended claims rather than by this detailed description. All changes which come within the meaning and range of equivalency of the claims are to be embraced within their scope.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussions of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize, in light of the description herein, that the invention can be practiced without one or more of the specific features or advantages of a particular embodiment. In other instances, additional features and advantages may be recognized in certain embodiments that may not be present in all embodiments of the invention.

Reference throughout this specification to "one embodiment", "an embodiment", or similar language means that a particular feature, structure, or characteristic described in connection with the indicated embodiment is included in at least one embodiment of the present invention. Thus, the phrases "in one embodiment", "in an embodiment", and similar language throughout this specification may, but do not necessarily, all refer to the same embodiment.

The embodiments described herein are directed to antenna systems for near-field communication (NFC) and wireless power transfer (e.g., wireless charging). As an example, an antenna system of a transmitting device (sometimes referred to herein as a "transmitting antenna system") wirelessly couples with an antenna system of a receiving device (sometimes referred to herein as a "receiving antenna system") to enable NFC-based communications and optionally, wireless power transfer. As described herein, a transmitting antenna system may be implemented in, for example, a laptop, a notebook, a tablet, a mobile phone, or other similar charging device, and a receiving antenna system may be implemented in, for example, a stylus, a mouse, a smartwatch, headphones, or other similar peripheral device. For the transmitting antenna system and the receiving antenna system to efficiently communicate and/or transfer power, a high coupling factor (k) (e.g., a minimum coupling factor of 0.1) between the antenna systems is desirable.

In conventional antenna systems, for example, a loop antenna or a coil wrapped around a ferrite element may be implemented to enable NFC-based communications and/or wireless power transfer. However, such antenna systems may need to be present in both a transmitting antenna system and a receiving antenna system to achieve a high enough coupling factor and sufficient magnetic flux ($\Phi$), such that electronics of a receiving device are operational. For example, a loop antenna (or a coil wrapped around a ferrite element) may need to be implemented as part of a transmitting antenna system and as part of a receiving antenna system to achieve a high enough coupling factor and sufficient magnetic flux. In the case in which a transmitting antenna system includes a coil wrapped around a ferrite element, and the receiving antenna system includes a loop antenna, the corresponding antenna system tends to exhibit weak coupling and insufficient flux. As such, interoperability between devices with different antenna systems can be limited.

Additionally, devices used for NFC-based communications and/or wireless charging often have stringent housing conditions that can inhibit an antenna system from achieving a high enough coupling factor and sufficient magnetic flux. For example, mobile phones, notebooks, laptops, and tablets often have height and width asymmetries that may not allow for a wide antenna opening (e.g., only allow for a narrow antenna opening). Narrow antenna openings (especially in devices with a metallic housing) make it difficult for antenna systems to perform NFC-based communications and wireless charging because the magnetic flux is restricted by a small generation space, a limited gap for emission, and additional damping due to a metal environment. Consequently, NFC-based communications may be limited by the structural constraints of conventional devices.

In accordance with an embodiment of the invention an antenna system includes a first ferrite element, a second ferrite element, a first coil wrapped around the first ferrite element, a second coil wrapped around the second ferrite element, a first antenna interface electrically coupled to the first coil, a second antenna interface electrically coupled to the second coil, and a conductor network connected between the first coil, the second coil, the first antenna interface, and the second antenna interface. As described herein, a "ferrite element" represents ferrite in the form of a rod, a cylinder, a sphere, or other three-dimensional (3-D) shape. By including the first coil wrapped around the first ferrite element and the second coil wrapped around the second ferrite element, the antenna system is able to achieve a high enough coupling factor and sufficient magnetic flux with a variety of other antenna systems (e.g., loop antennas, single coil and ferrite rod antennas, 8-shape coil antennas, dual loop-shaped coil antennas, and triple loop-shaped coil antennas). The structure of the antenna system also enables implementation in devices with narrow antenna openings. As such, the antenna system improves interoperability with other antenna systems and expands application to a broader range of devices.

In some embodiments, an antenna system emits radio frequency (RF) fields to enable NFC-based communications and/or wireless charging. For example, a transmitting antenna system and a receiving antenna system may each emit and/or receive RF fields to achieve a high enough coupling factor and sufficient magnetic flux. Examples of RF fields produced by an antenna system are described in further detail with reference to FIGS. 1A-1C.

Figure 1A:
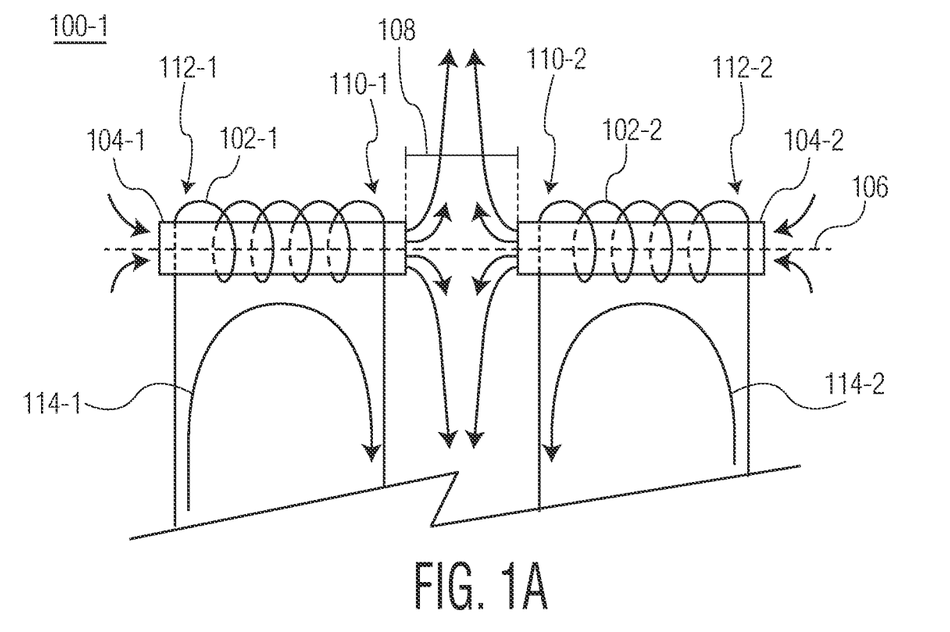
FIG. 1A illustrates an example of radio frequency (RF) fields produced by an antenna system.

FIG. 1A illustrates an example of RF fields produced by an antenna system 100-1. In the embodiment of FIG. 1A, the antenna system 100-1 includes a first coil 102-1 wrapped around a first ferrite element 104-1 and a second coil 102-2 wrapped around a second ferrite element 104-2. Although not shown, the first coil 102-1 is electrically coupled to a first antenna interface (not shown) and the second coil 102-2 is electrically coupled to a second antenna interface (not shown). In addition, a conductor network (not shown) is connected between the first coil 102-1, the second coil 102-2, the first antenna interface, and the second antenna interface. As described herein, an antenna interface may be a physical and electrical connection between a conductor network of an antenna system (e.g., the antenna system 100-1) and a transmit circuit, and may be, for example, a terminal, a conductive pad, a node, a communication point, a connector, and/or other conductor.

The first ferrite element 104-1 and the second ferrite element 104-2 are aligned along an axis 106 and separated by a distance 108 (e.g., a distance ranging from 0-10 millimeters (mm) or more). Although the ferrite elements are described as being separated by the distance 108, the ferrite elements may also be positioned relative to each other to achieve a minimum coupling factor of 0.1 and meet application-specific requirements. In an embodiment, the ferrite elements may be elongated members aligned along the axis, such that the center of each ferrite element is aligned with the axis. In an embodiment, the ferrite elements may be aligned along the axis, such that the first and second ferrite elements are configured end-to-end relative to each other.

As described herein, "end-to-end" may imply that end surfaces of the first and second ferrite elements are positioned closer to each other (e.g., at a distance ranging from 0-10 mm or more) than any other surfaces of the first and second ferrite elements. As an example, the first and second ferrite elements are configured end-to-end relative to each other when the end surfaces of the first and second ferrite elements are positioned closer to each other than major surfaces of the first and second ferrite elements. As another example, the first and second ferrite elements are configured end-to-end relative to each other when the end surfaces of the first second ferrite elements face each other (e.g., directly or at an angle), and are closer to each other than major surfaces of the first and second ferrite elements. As yet another example, the first and second ferrite elements are configured end-to-end relative to each other when the end surfaces of the first and second ferrite elements are closer to each other than major surfaces of the first and second ferrite elements, and when the major surfaces are aligned along an axis or are angled relative to an axis. As an example, an "end surface" may be a base surface or other non-major surface of a ferrite element, and a "major surface" may be a lateral surface, elongated surface, or other non-base surface of the ferrite element.

In an embodiment, the first ferrite element 104-1 and the second ferrite element 104-2 may each have a cross section dimension that is orders of magnitude smaller than the length dimension. For example, the first ferrite element and the second ferrite element each have a length ranging from 5-40 mm and a width ranging from 1-6 mm. The first ferrite element and the second ferrite element may each have a core material of, for example, "Maruwa FSF 131", with an inductance of 732.6 nH and a quality factor of 28.6. Furthermore, the characteristics of the ferrite elements may be altered to meet application-specific requirements, such that the first ferrite element and the second ferrite element are not limited to the embodiments previously described.

In an embodiment, the first coil 102-1 and the second coil 102-2 each have a core size of 3 mm×3 mm×10 mm, a length of 8 mm, and a wire diameter of 0.2 mm. As an example, the first coil 102-1 wraps around the first ferrite element 104-1 ten times (e.g., ten coil turns) and the second coil 102-2 wraps around the second ferrite element 104-2 ten times. The first coil and the second coil may each have a core material of, for example, "Maruwa FSF 131", with an inductance of 483 nanohenrys (nH) and a quality factor of 78.7. Furthermore, the characteristics of the coils may be altered to meet application-specific requirements, such that the first coil and the second coil are not limited to the embodiments previously described.

In an embodiment, the first coil 102-1 and the second coil 102-2 each feature an inner end and an outer end. The first coil has an inner end 110-1 and an outer end 112-1, such that the first coil wraps around opposite sides at the inner end 110-1 (shown by solid line that represents one side of the first ferrite element 104-1) and at the outer end 112-1 (shown by dashed line that represents another side of the first ferrite element 104-1). The second coil has an inner end 110-2 and an outer end 112-2, such that the second coil wraps around opposite sides at the inner end 110-2 (shown by dashed line that represents one side of the second ferrite element 104-2) and at the outer end 112-2 (shown by solid line that represents another side of the second ferrite element 104-2). As described herein, the inner ends of the first and second coils may be the ends of each coil that are nearest each other, and the outer ends of the first and second coils may be the ends of each coil that are farthest apart.

In an embodiment, a first current (shown by arrow 114-1) is provided to the first coil 102-1 and a second current (shown by arrow 114-2) is provided to the second coil 102-2. In such an embodiment, the first current and the second current flow in opposite directions. The first current flows from the outer end 112-1 of the first coil to the inner end 110-1 of the first coil, and the second current flows from the outer end 112-2 of the second coil to the inner end 110-2 of the second coil. Although not shown, a direction of the first current and a direction of the second current may be controlled by switches included in the conductor network.

In addition, the first current and the second current produce RF fields. The first current produces a first RF field (shown by arrows at each end of the first ferrite element 104-1) and the second current produces a second RF field (shown by arrows at each end of the second ferrite element 104-2). Because the first current and the second current flow in opposite directions, the first RF field and the second RF field are emitted outwards between the first ferrite element 104-1 and the second ferrite element 104-2. Additionally, the first RF field and the second RF field are emitted outwards because the RF fields oppose (and repel) each other (similar to opposing poles of a magnet) and spread radially between the ferrite elements.

Although the first RF field and the second RF field are shown as being emitted outwards on a two dimensional (2-D) plane, the RF fields may be emitted outwards as a 3-D shape. As an example, the RF fields are emitted outwards as a 3-D hyperbolic shape, a 3-D parabolic shape, or a 3-D cone shape. In an embodiment, the first RF field and the second RF field are emitted approximately perpendicular (e.g., ±10 degrees of perpendicular) to the axis 106. In another embodiment, the first RF field and the second RF field may be emitted at angles of, e.g., 0-45 degrees relative to the axis.

By emitting the first RF field and the second RF field outwards between the first ferrite element and the second ferrite element, the antenna system 100-1 can achieve a high enough coupling and sufficient magnetic flux with receiving antenna systems that feature, e.g., loop antennas, single coil and ferrite rod antennas, multiple coil and ferrite rod antennas, dual loop-shaped coil antennas, triple loop-shaped coil antennas, etc. Such embodiments will be described in further detail with reference to FIGS. 3A-3D.

Figure 1B:
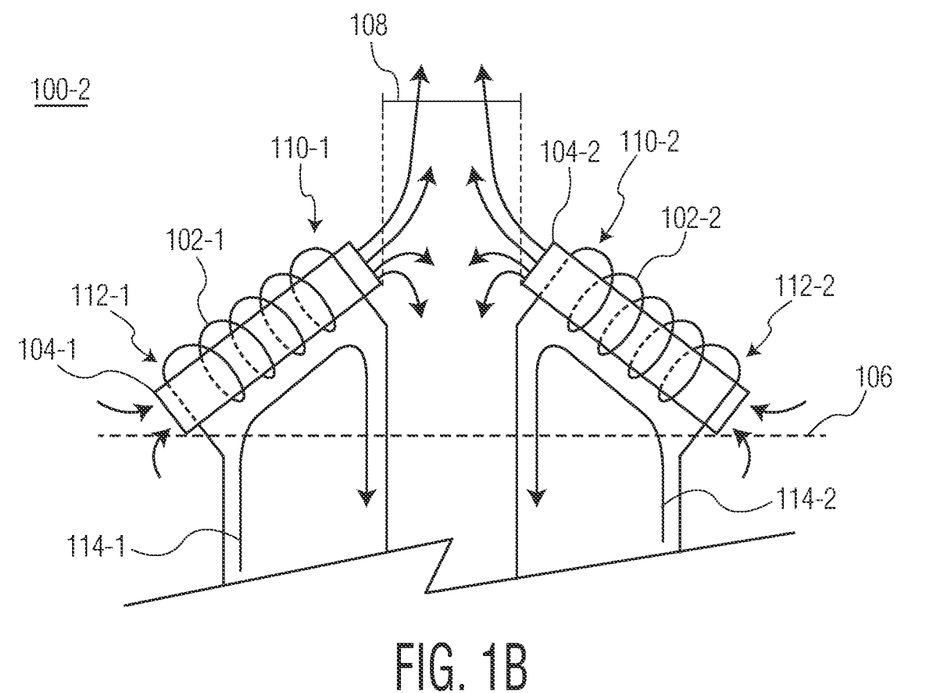
FIG. 1B illustrates another example of RF fields produced by an antenna system.

FIG. 1B illustrates another example of RF fields produced by an antenna system 100-2. In the embodiment of FIG. 1B, the antenna system 100-2 includes the first coil 102-1, the second coil 102-2, the first ferrite element 104-1 and the second ferrite element 104-2 separated by the distance 108, the first antenna interface (not shown), the second antenna interface (not shown), and the conductor network (not shown) as described with reference to FIG. 1A. Additionally, the first current (shown by arrow 114-1) that flows from the outer end 112-1 of the first coil to the inner end 110-1 of the first coil, and that produces the first RF field (shown by arrows at each end of the first ferrite element 104-1) is provided to the first coil 102-1, and the second current (shown by arrow 114-2) that flows from the outer end 112-2 of the second coil to the inner end 110-2 of the second coil, and that produces the second RF field (shown by arrows at each end of the second ferrite element 104-2) is provided to the second coil 102-2 as described with reference to FIG. 1A.

In contrast to FIG. 1A, the first ferrite element 104-1 and the second ferrite element 104-2 of FIG. 1B are angled relative to the axis 106. In an embodiment, the first ferrite element and the second ferrite element are elongated members that are angled relative to the axis 106 and that are configured end-to-end relative to each other. As an example, the first ferrite element 104-1 and the second ferrite element 104-2 may be at an angle between 0-45 degrees relative to the axis 106 (and hence relative to each other). By angling the first ferrite element and the second ferrite element relative to the axis 106, the first RF field and the second RF field may be emitted further distances in certain directions (e.g., perpendicular to the axis 106) because the density and volume of each RF field increases at the inner ends 110-1 and 110-2 of the coils. Therefore, angling the first ferrite element and the second ferrite element relative to the axis allows the antenna system 100-2 to produce a high enough coupling and sufficient magnetic flux with receiving antenna systems that feature, e.g., angled single coil and ferrite rod antennas, multiple coil and ferrite rod antennas, etc.

Figure 1C:
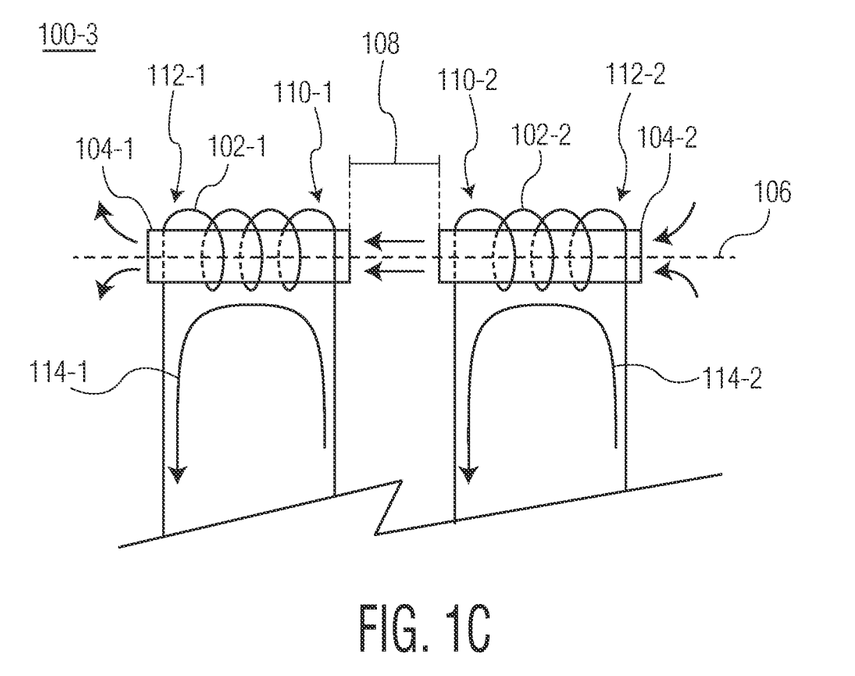
FIG. 1C illustrates another example of RF fields produced by an antenna system.

FIG. 1C illustrates another example of RF fields produced by an antenna system 100-3. In the embodiment of FIG. 1C, the antenna system 100-3 includes the first coil 102-1, the second coil 102-2, the first ferrite element 104-1 and the second ferrite element 104-2 separated by the distance 108 along the axis 106, the first antenna interface (not shown), the second antenna interface (not shown), and the conductor network (not shown) as described with reference to FIG. 1A. Additionally, the first current (shown by arrow 114-1) that produces the first RF field (shown by arrows at each end of the first ferrite element 104-1) is provided to the first coil 102-1, and the second current (shown by arrow 114-2) that produces the second RF field (shown by arrows at each end of the second ferrite element 104-2) is provided to the second coil 102-2 as described with reference to FIG. 1A.

In contrast to FIG. 1A, the first current and the second current of FIG. 1C flow in the same direction, such that the first current flows from the inner end 110-1 of the first coil to the outer end 112-1 of the first coil, and the second current flows from the outer end 112-2 of the second coil to the inner end 110-2 of the second coil. Because the currents flow in the same direction, the first RF field and the second RF field are emitted along the axis 106. Additionally, the RF fields are emitted along the axis because the second RF field is collected by the first RF field between the ferrite elements, such that the second RF field flows through the first coil 102-1.

Although the RF fields are shown as being emitted along the axis from right to left, the RF fields may also be emitted along the axis from left to right if the current direction is changed. Additionally, although the first RF field and the second RF field are shown as being emitted along the axis on a two dimensional (2-D) plane, the RF fields may be emitted as a 3-D shape. As an example, the RF fields are emitted along the axis as a 3-D cylindrical shape at the inner ends of the ferrite elements, and as a 3-D parabolic shape or a 3-D hyperbolic shape at the outer ends of the ferrite elements. In an embodiment, the first RF field and the second RF field are emitted approximately parallel (e.g., ±10 degrees of parallel) to the axis 106 at the inner ends of the ferrite elements, and approximately perpendicular (e.g., ±10 degrees of perpendicular) to the axis 106 (in a semi-circular shape) at the outer ends of the ferrite elements.

By emitting the first RF field and the second RF field along the axis 106, the antenna system 100-3 can achieve a high enough coupling and sufficient magnetic flux with receiving antenna systems that feature, e.g., single coil and ferrite rod antennas, 8-shape coil antennas, etc. Such embodiments will be described in further detail with reference to FIG. 3E and FIG. 3F.

In some embodiments, an antenna system may be included as part of system that also includes a transmit circuit. For example, the transmit circuit may provide power to the antenna system to enable various NFC-based communication and/or wireless charging operations. Examples of systems that include an antenna system and a transmit circuit are described in further detail with reference to FIG. 2A and FIG. 2B.

Figure 2A:
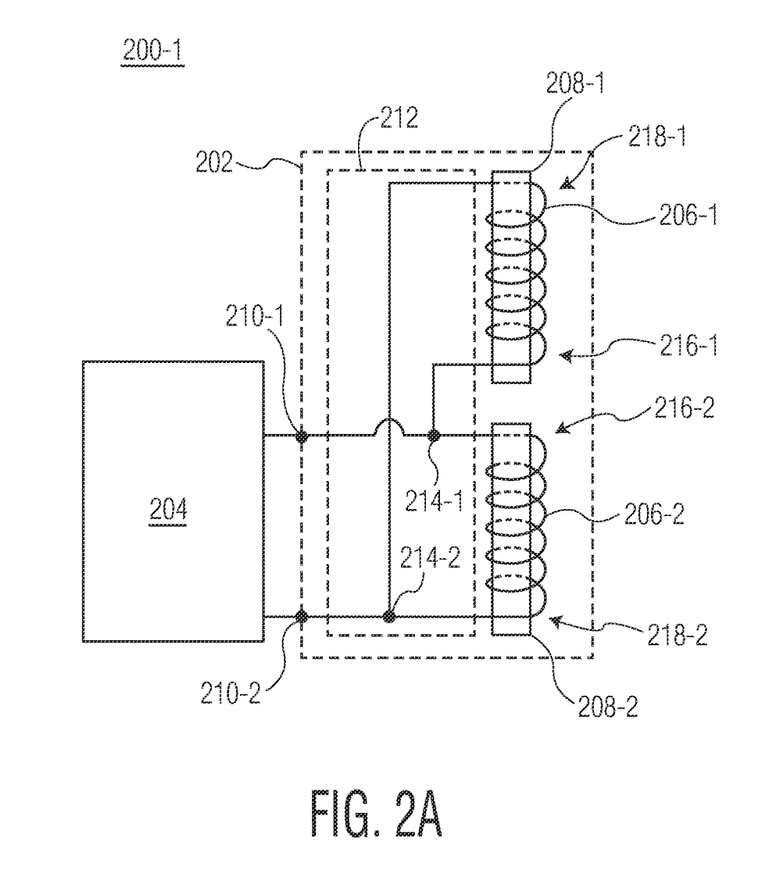
FIG. 2A depicts an example of a system.

FIG. 2A depicts an example of a system 200-1. The system 200-1 includes an antenna system 202 and a transmit circuit 204. The antenna system 202 includes a first coil 206-1 wrapped around a first ferrite element 208-1 and a second coil 206-2 wrapped around a second ferrite element 208-2. The first coil 206-1 is electrically coupled to a first antenna interface 210-1 and the second coil 206-2 is electrically coupled to a second antenna interface 210-2. The antenna system 202 also features a conductor network 212 connected between the first coil 206-1, the second coil 206-2, the first antenna interface 210-1, and the second antenna interface 210-2.

In an embodiment, the conductor network 212 includes a first node 214-1 and a second node 214-2 that connect ends of the first coil 206-1 and the second coil 206-2. The first node 214-1 connects an inner end 216-1 of the first coil and an inner end 216-2 of the second coil, and the second node 214-2 connects an outer end 218-1 of the first coil and an outer end 218-2 of the second coil. In an embodiment, the conductor network 212 also facilitates flow of a first current (not shown) and a second current (not shown), such that the first current is provided to the first coil 206-1 and the second current is provided to the second coil 206-2. Although not shown, the conductor network 212 may also include switches that control a direction of the first current and a direction of the second current.

In an embodiment, the transmit circuit 204 is connected to the conductor network 212 through the first antenna interface 210-1 and the second antenna interface 210-2. As an example, the first antenna interface 210-1 and the second antenna interface 210-2 are points of connection between the transmit circuit 204 and the conductor network 212 of the antenna system 202. In an embodiment, an antenna interface (e.g., the first antenna interface 210-1 and/or the second antenna interface 210-2) may include a conductive pad, a terminal, a node, a communication point, a connector, and/or other conductive element. In an embodiment, the transmit circuit 204 is a packaged device and the antenna interfaces include conductive pads on the packaged device to which conductive paths between the antenna interfaces and the conductive pads are physically and electrically connected. The transmit circuit 204 is configured to produce the first current and the second current. As an example, the transmit circuit 204 may be a half bridge inverter, a full bridge inverter, or a class D amplifier. As another example, an amplifier can be connected, such that the amplifier may need a matching network to tune antenna impedance to a certain input impedance. In such an example, the matching network may be needed for electromagnetic interference (EMI) purposes and so that the amplifier does not exceed its power capabilities.

Although the system 200-1 is shown in FIG. 2A as being arranged in a certain topology, the topology of the system is not limited to the topology shown in FIG. 2A. For example, the first coil 206-1 and the first ferrite element 208-1 and/or the second coil 206-2 and the second ferrite element 208-2 may be angled relative to an axis as described with reference to FIG. 1B.

Figure 2B:
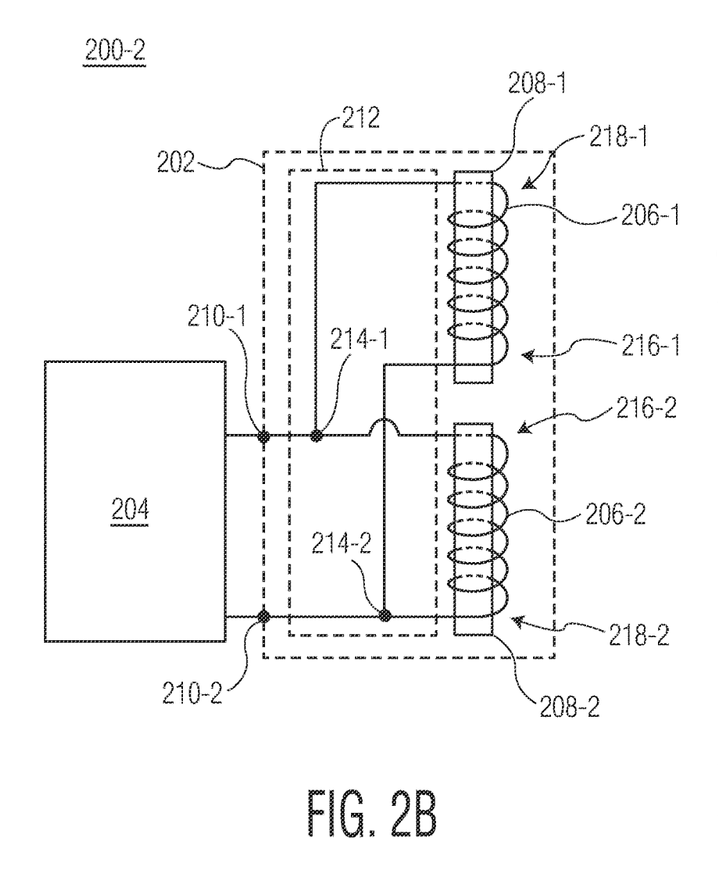
FIG. 2B depicts another example of a system.

FIG. 2B depicts another example of a system 200-2. The system 200-2 includes the antenna system 202 and the transmit circuit 204 of FIG. 2A. The antenna system 202 includes the first coil 206-1, the second coil 206-2, the first ferrite element 208-1, the second ferrite element 208-2, the first antenna interface 210-1, the second antenna interface 210-2, and the conductor network 212 that is connected to the transmit circuit 204 as described with reference to FIG. 2A.

In contrast to FIG. 2A, the first node 214-1 and the second node 214-2 included in the conductor network 212 of the system 200-2 electrically couples different ends of the first coil 206-1 and the second coil 206-2. The first node 214-1 connects the outer end 218-1 of the first coil and the inner end 216-2 of the second coil, and the second node 214-2 connects the inner end 216-1 of the first coil and the outer end 218-2 of the second coil. By connecting the first coil and the second coil using the arrangement shown in FIG. 2B, the currents produced by the transmit circuit 204 may be allowed to flow in different directions in comparison to the currents in the system 200-1 of FIG. 2A.

Although the first node 214-1 and the second node 214-2 of FIG. 2A and FIG. 2B are shown as connecting the first coil and the second coil in a certain arrangement, the nodes may connect the coils differently and are not limited to the connections shown.

Figure 2C:
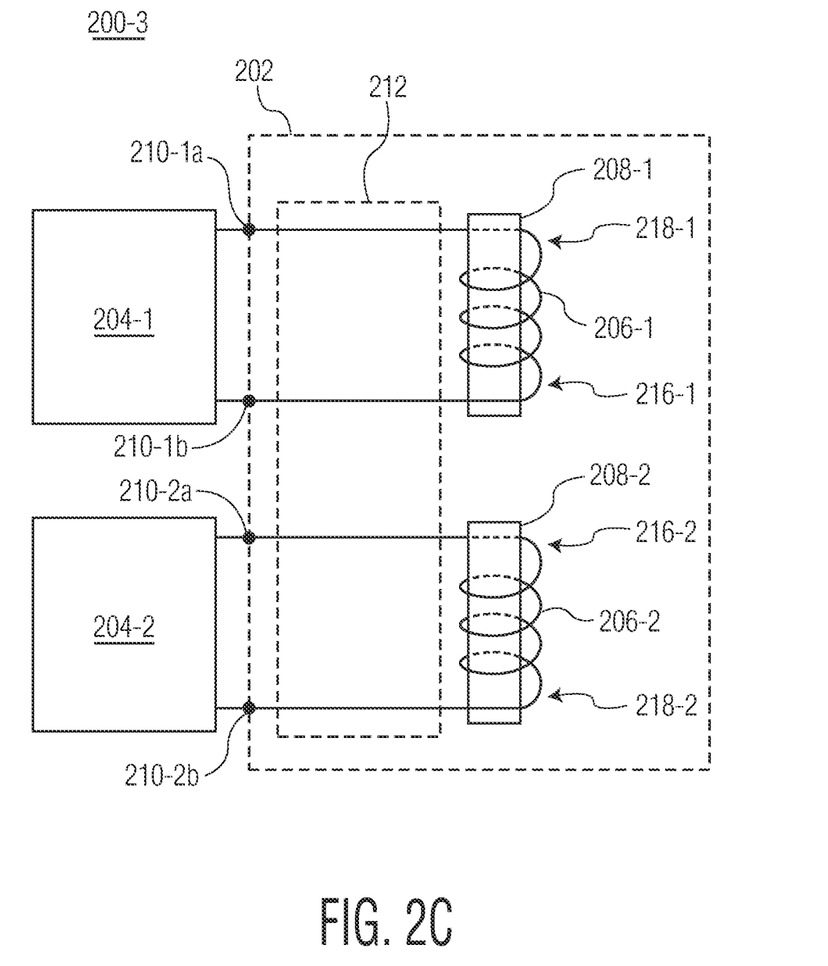
FIG. 2C depicts another example of a system.

FIG. 2C depicts another example of a system 200-3. The system 200-3 includes an antenna system 202 that includes the first coil 206-1, the second coil 206-2, the first ferrite element 208-1, the second ferrite element 208-2, and the conductor network 212 as described with reference to FIG. 2A.

In contrast to FIG. 2A, the system 200-3 includes two transmit circuits, implemented as a first transmit circuit 204-1 and a second transmit circuit 204-1. The first transmit circuit 204-1 and the second transmit circuit 204-2 are connected to the antenna system 202, such that the first transmit circuit is connected to the first coil 206-1 and the second transmit circuit is connected to the second coil 206-1. In an embodiment, the first transmit circuit is connected to the first coil via a first set of antenna interfaces, implemented as a first antenna interface of the first transmit circuit 210-1$a$ and a second antenna interface of the first transmit circuit 210-1$b$. In such an embodiment, the second transmit circuit is connected to the second coil via a second set of antenna interfaces, implemented as a first antenna interface of the second transmit circuit 210-2$a$ and a second antenna interface of the second transmit circuit 210-2$b$.

By connecting the first coil and the second coil using the arrangement shown in FIG. 2C, currents within the system 200-3 may be independent of each other. For example, the first transmit circuit 204-1 produces a first current that is provided to the first coil, and the second transmit circuit 204-2 produces a second current that is provided to the second coil.

In some embodiments, an antenna system may be electrically coupled with another antenna system for NFC-based communications and/or wireless charging. For example, a transmitting antenna system may be electrically coupled with a receiving antenna system so that RF fields can be transmitted and/or received by each system. As such, the RF fields exchanged by the antenna systems may align to produce a high enough coupling factor and sufficient magnetic flux, such that NFC-based communications and/or wireless charging may be enabled. Examples of a transmitting antenna system electrically coupled with a receiving antenna system are described in further detail with reference to FIGS. 3A-3F.

Figure 3A:
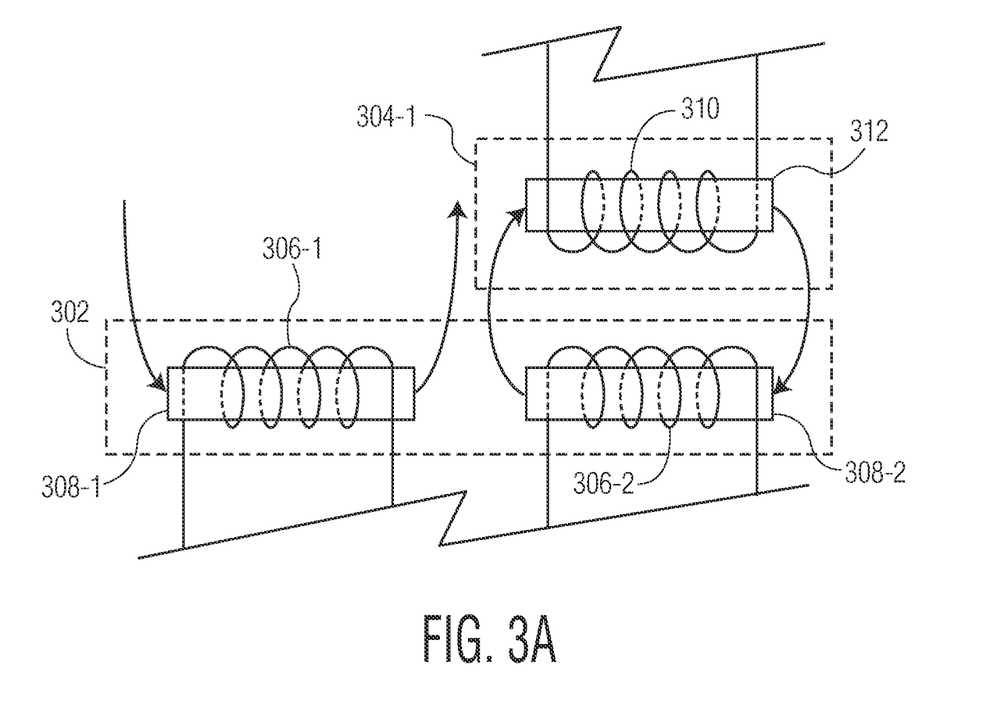
FIG. 3A is an example of a transmitting antenna system electrically coupled with a receiving antenna system.

FIG. 3A is an example of a transmitting antenna system 302 electrically coupled with a receiving antenna system 304-1. The transmitting antenna system 302 includes a first coil 306-1, a second coil 306-2, a first ferrite element 308-1, a second ferrite element 308-2, a first antenna interface (not shown), a second antenna interface (not shown), and a conductor network (not shown), and produces a first RF field (shown by arrows at each end of the first ferrite element 308-1) and a second RF field (shown by arrows at each end of the second ferrite element 308-2) as described with reference to FIG. 1A and FIG. 2A.

The receiving antenna system 304-1 includes a coil 310 wrapped around a ferrite element 312. Although not shown, the receiving antenna system 304-1 may also include a conductor network similar to the transmitting antenna system 302, such that a current is provided to the coil 310 and produces an RF field (shown by arrows at each end of the ferrite element 312). In an embodiment, the second RF field of the transmitting antenna system 302 and the RF field of the receiving antenna system 304-1 are exchanged to enable NFC-based communications and/or wireless charging. Additionally, although the receiving antenna system 304-1 is aligned with the second coil 306-2 and the second ferrite element 308-2 of the transmitting antenna system 302, the receiving antenna system may also be aligned with the first coil 306-1 and the first ferrite element 308-1 of the transmitting antenna system.

Figure 3B:
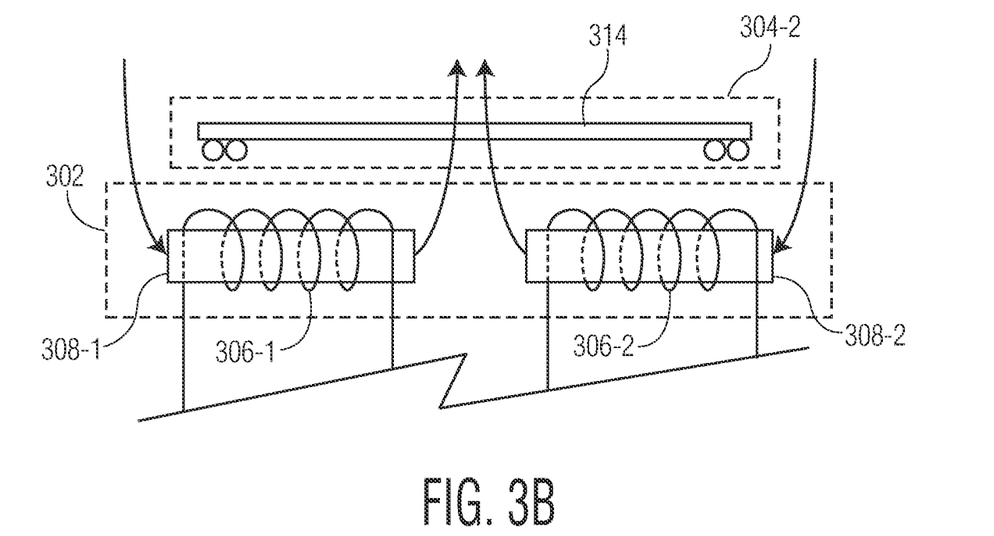
FIG. 3B is another example of a transmitting antenna system electrically coupled with a receiving antenna system.

FIG. 3B is another example of a transmitting antenna system 302 electrically coupled with a receiving antenna system 304-2. The transmitting antenna system 302 includes a first coil 306-1, a second coil 306-2, a first ferrite element 308-1, a second ferrite element 308-2, a first antenna interface (not shown), a second antenna interface (not shown), and a conductor network (not shown), and produces a first RF field (shown by arrows at each end of the first ferrite element 308-1) and a second RF field (shown by arrows at each end of the second ferrite element 308-2) as described with reference to FIG. 1A and FIG. 2A.

The receiving antenna system 304-2 of FIG. 3B includes a loop coil 314. Although not shown, the receiving antenna system 304-2 may also include a conductor network similar to the transmitting antenna system 302 that provides a current to the loop coil 314. In an embodiment, the first RF field and the second RF field emitted by the transmitting antenna system 302 are received by the receiving antenna system 304-2 to enable NFC-based communications and/or wireless charging.

Figure 3C:
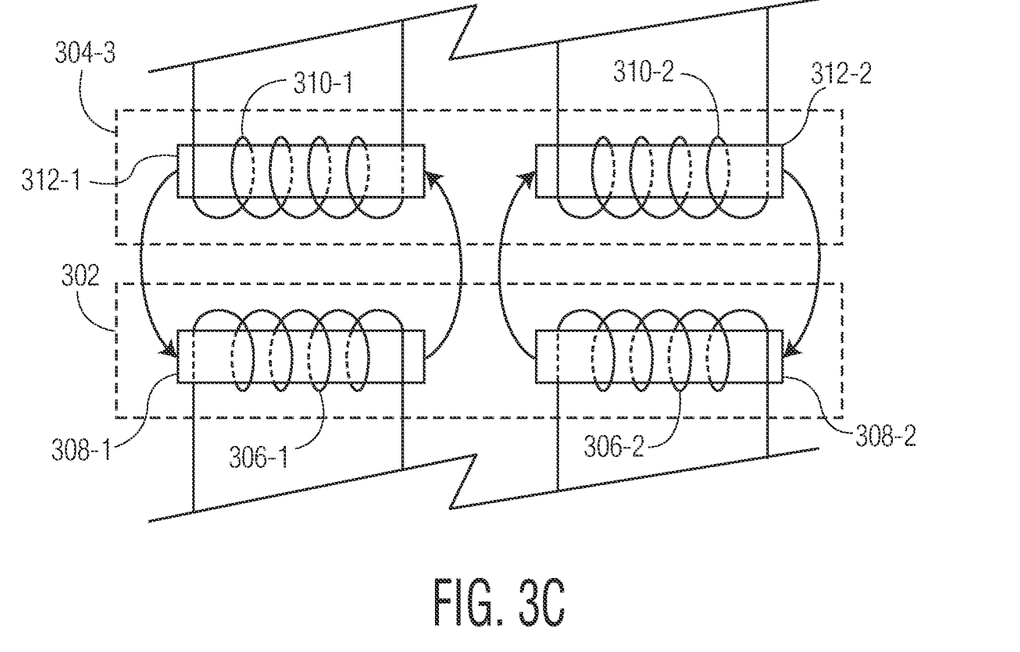
FIG. 3C is another example of a transmitting antenna system electrically coupled with a receiving antenna system.

FIG. 3C is another example of a transmitting antenna system 302 electrically coupled with a receiving antenna system 304-3. The transmitting antenna system 302 includes a first coil 306-1, a second coil 306-2, a first ferrite element 308-1, a second ferrite element 308-2, a first antenna interface (not shown), a second antenna interface (not shown), and a conductor network (not shown), and produces a first RF field (shown by arrows at each end of the first ferrite element 308-1) and a second RF field (shown by arrows at each end of the second ferrite element 308-2) as described with reference to FIG. 1A and FIG. 2A.

The receiving antenna system 304-3 of FIG. 3C includes a coil 310-1 wrapped around a ferrite element 312-1 and another coil 310-2 wrapped around another ferrite element 312-2. Although not shown, the receiving antenna system 304-3 may also include a conductor network similar to the transmitting antenna system 302 that provides currents to the coils 310-1 and 310-2, such that the currents produce RF fields (shown by arrows at each end of the ferrite elements 312-1 and 312-2). In an embodiment, the RF fields of the transmitting antenna system 302 and the RF fields of the receiving antenna system 304-3 are exchanged to enable NFC-based communications and/or wireless charging.

Figure 3D:
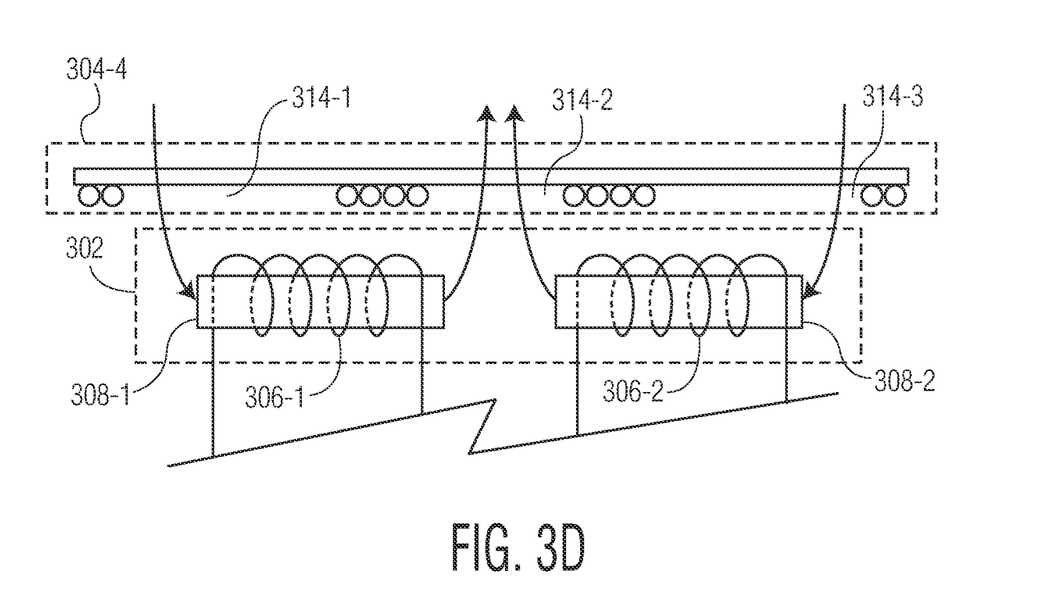
FIG. 3D is another example of a transmitting antenna system electrically coupled with a receiving antenna system.

FIG. 3D is another example of a transmitting antenna system 302 electrically coupled with a receiving antenna system 304-4. The transmitting antenna system 302 includes a first coil 306-1, a second coil 306-2, a first ferrite element 308-1, a second ferrite element 308-2, a first antenna interface (not shown), a second antenna interface (not shown), and a conductor network (not shown), and produces a first RF field (shown by arrows at each end of the first ferrite element 308-1) and a second RF field (shown by arrows at each end of the second ferrite element 308-2) as described with reference to FIG. 1A and FIG. 2A.

The receiving antenna system 304-4 of FIG. 3D includes a triple loop coil that features a first loop coil 314-1, a second loop coil 314-2, and a third loop coil 314-3. Although not shown, the receiving antenna system 304-4 may also include a conductor network similar to the transmitting antenna system 302 that provides currents to the loop coils 314-1, 314-2, and 314-3. In an embodiment, the first RF field and the second RF field emitted by the transmitting antenna system 302 are received by the receiving antenna system 304-4 to enable NFC-based communications and/or wireless charging.

Figure 3E:
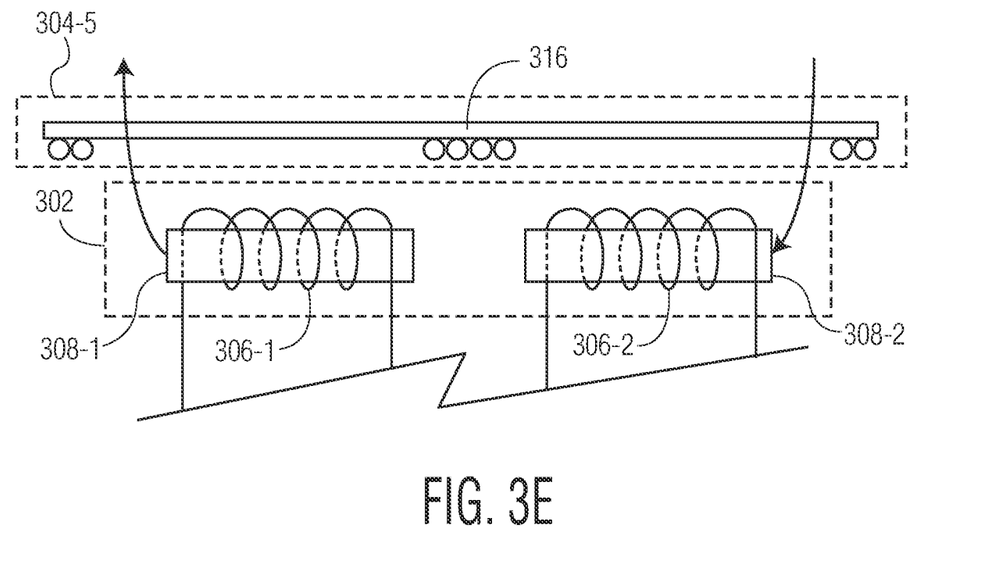
FIG. 3E is another example of a transmitting antenna system electrically coupled with a receiving antenna system.

FIG. 3E is another example of a transmitting antenna system 302 electrically coupled with a receiving antenna system 304-5. The transmitting antenna system 302 includes a first coil 306-1, a second coil 306-2, a first ferrite element 308-1, a second ferrite element 308-2, a first antenna interface (not shown), a second antenna interface (not shown), and a conductor network (not shown), and produces a first RF field (shown by arrows at each end of the first ferrite element 308-1) and a second RF field (shown by arrows at each end of the second ferrite element 308-2) as described with reference to FIG. 1C and FIG. 2B.

The receiving antenna system 304-5 of FIG. 3E includes an 8-shape coil 316. Although not shown, the receiving antenna system 304-5 may also include a conductor network similar to the transmitting antenna system 302 that provides a current to the 8-shape coil 316. In an embodiment, the RF fields of the transmitting antenna system 302 and the RF field of the receiving antenna system 304-5 are exchanged to enable NFC-based communications and/or wireless charging. NFC-based communications and/or wireless charging are enabled by the exchanged RF fields because flux is passing through each loop of the 8-shape coil 316 in opposite directions. In such an embodiment, the flux adds up due to the nature of the 8-shape coil.

Although the receiving antenna system 304-5 is shown as an 8-shape coil, the receiving antenna system may also be a dual loop coil, such that the dual loop coil may be similarly aligned with the transmitting antenna system 302 or shifted relative to the transmitting antenna system.

Figure 3F:
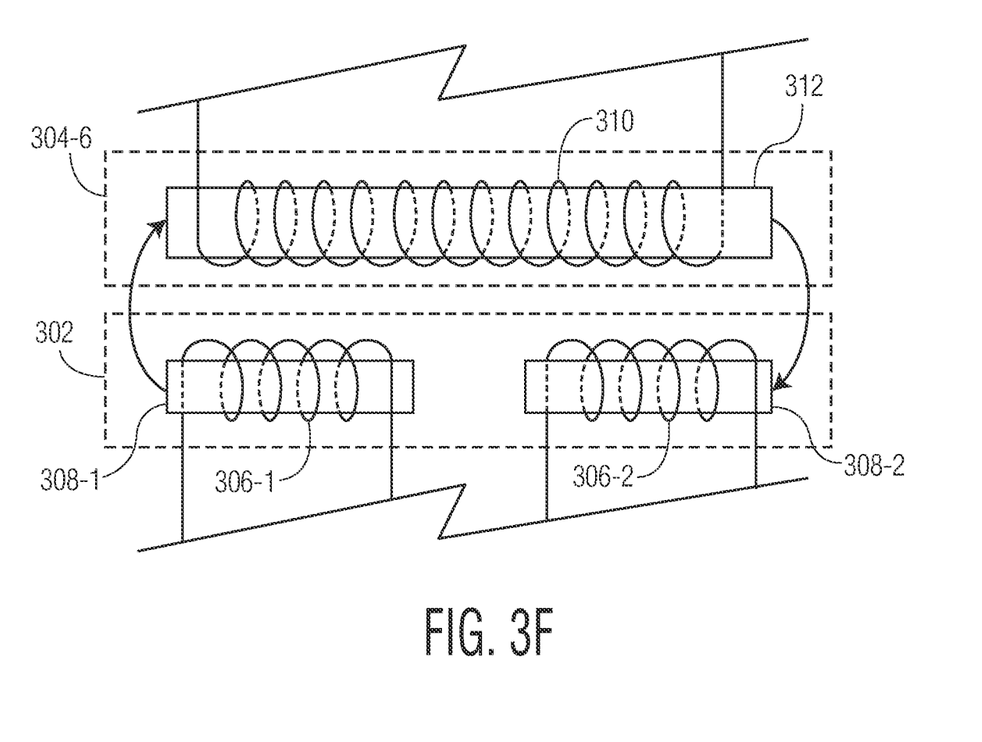
FIG. 3F is another example of a transmitting antenna system electrically coupled with a receiving antenna system.

FIG. 3F is another example of a transmitting antenna system 302 electrically coupled with a receiving antenna system 304-6. The transmitting antenna system 302 includes a first coil 306-1, a second coil 306-2, a first ferrite element 308-1, a second ferrite element 308-2, a first antenna interface (not shown), a second antenna interface (not shown), and a conductor network (not shown), and produces a first RF field (shown by arrows at each end of the first ferrite element 308-1) and a second RF field (shown by arrows at each end of the second ferrite element 308-2) as described with reference to FIG. 1C and FIG. 2B.

The receiving antenna system 304-6 of FIG. 3F includes a coil 310 and a ferrite element 312. Although not shown, the receiving antenna system 304-6 may also include a conductor network similar to the transmitting antenna system 302 that provides a current to the coil 310, such that the current produces an RF field (shown by arrows at each end of the ferrite element 312). In an embodiment, the RF fields of the transmitting antenna system 302 and the RF field of the receiving antenna system 304-6 are exchanged to enable NFC-based communications and/or wireless charging.

In some embodiments, a system (e.g., system 200-1, 200-2, or 200-3) that features an antenna system and a transmitter circuit may be included as part of a device. For example, the system of the device may enable NFC-based communications and/or wireless charging operations with other systems included in other devices. Examples of devices that include systems are described in further detail with reference to FIG. 4A, FIG. 4B, and FIG. 5.

Figure 4A:
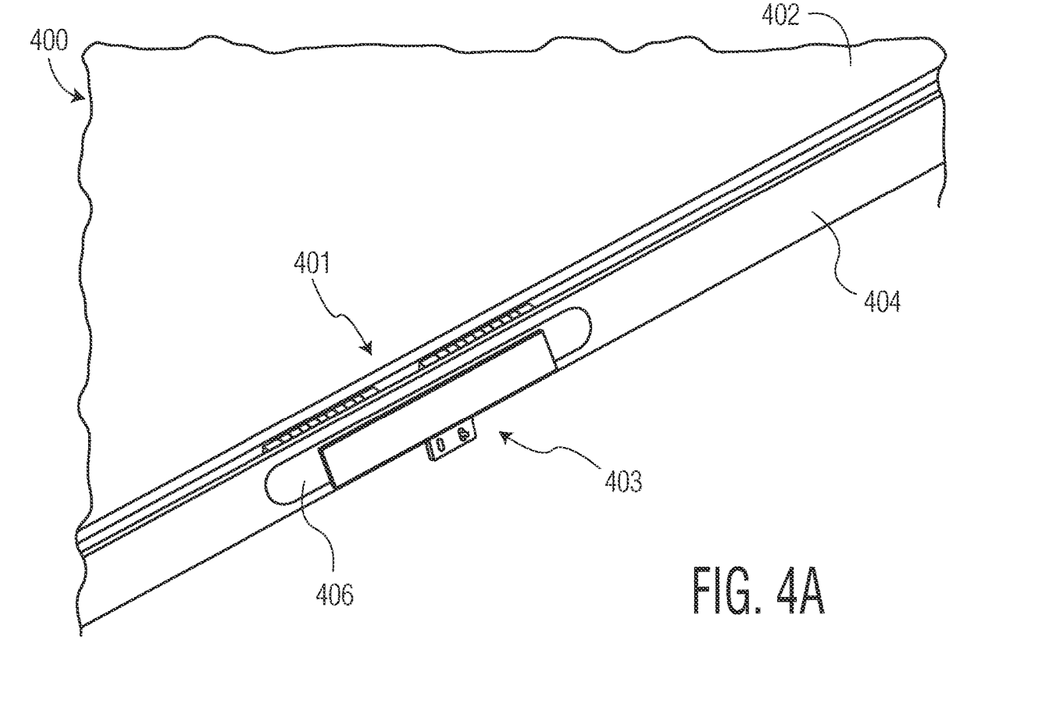
FIG. 4A depicts an isometric view of a device.

FIG. 4A depicts an isometric view of a device 400. In the embodiment of FIG. 4A, the device 400 features an inner housing frame 402, an outer housing frame 404, a transmitting antenna system 401 (partially shown), and a receiving antenna system 403 (partially shown). The inner housing frame 402 and the outer housing frame 404 may be made of, for example, a metal, a plastic, a composite material, or any combination thereof. The outer housing frame 404 includes an inner housing region 406 that may allow the transmitting antenna system and the receiving antenna system to transmit and/or receive RF fields. As an example, the inner housing region 406 is made of a plastic and is a cylindrical prism. Although the inner housing region 406 is described as a cylindrical prism, the inner housing region may also be a rectangular prism, circular prism, or other prism.

Figure 4B:
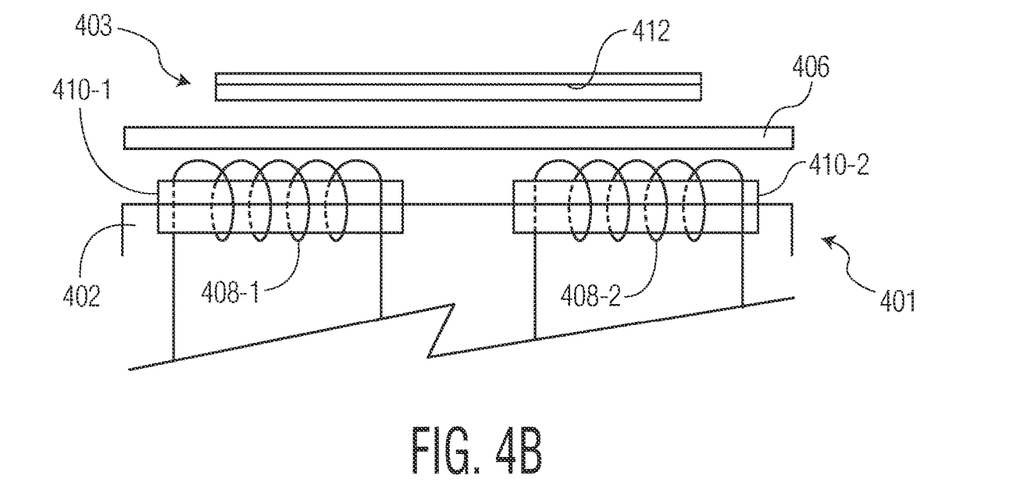
FIG. 4B depicts a top view of the device of FIG. 4A.

FIG. 4B depicts a top view of the device 400 of FIG. 4A. The transmitting antenna system 401 and the receiving antenna system 403 are shown on each side of the inner housing region 406.

The receiving antenna system 403 includes a receiving coil 412. The receiving coil 412 may be, for example, a dual loop-shaped coil, a triple loop-shaped coil, an 8-shape coil, etc. Although not shown, the receiving antenna system may be included in a receiving device that is mounted to the outer housing frame 404. As an example, the receiving device may be mounted to the outer housing frame 404 via a mounting mechanism such as, for example, magnets, adhesives, suction, etc. The mounting mechanism may position the receiving device such that the receiving coil 412 aligns with the transmitting antenna system through the inner housing region 406.

The transmitting antenna system 401 includes a first coil 408-1 wrapped around a first ferrite element 410-1 and a second coil 408-2 wrapped around a second ferrite element 410-2. Although not shown, the transmitting antenna system also includes a first antenna interface, a second antenna interface, and a conductor network, each of which may be located within the inner housing frame 402 and are as described with reference to FIG. 2A, FIG. 2B, or FIG. 2C. The coils 408-1, 408-2 and the ferrite elements 410-1, 410-2 are positioned along a peripheral surface of the device 400, such that the coils and the ferrite elements are positioned between the inner housing frame 402 and the outer housing frame 404. Such positioning allows the transmitting antenna system to perform communications and/or wireless power transfer with the receiving antenna system.

In the embodiment of FIG. 4B, the first coil 408-1, the second coil 408-2, the first ferrite element 410-1, and the second ferrite element 410-2 are shown as being positioned along the peripheral surface of the inner housing frame 402 and adjacent to an inner surface of the inner housing region 406. The receiving coil 412 of the receiving antenna system is positioned across from the components of the transmitting antenna system, such that the receiving coil is positioned along an outer surface of the inner housing region 406.

Figure 5:
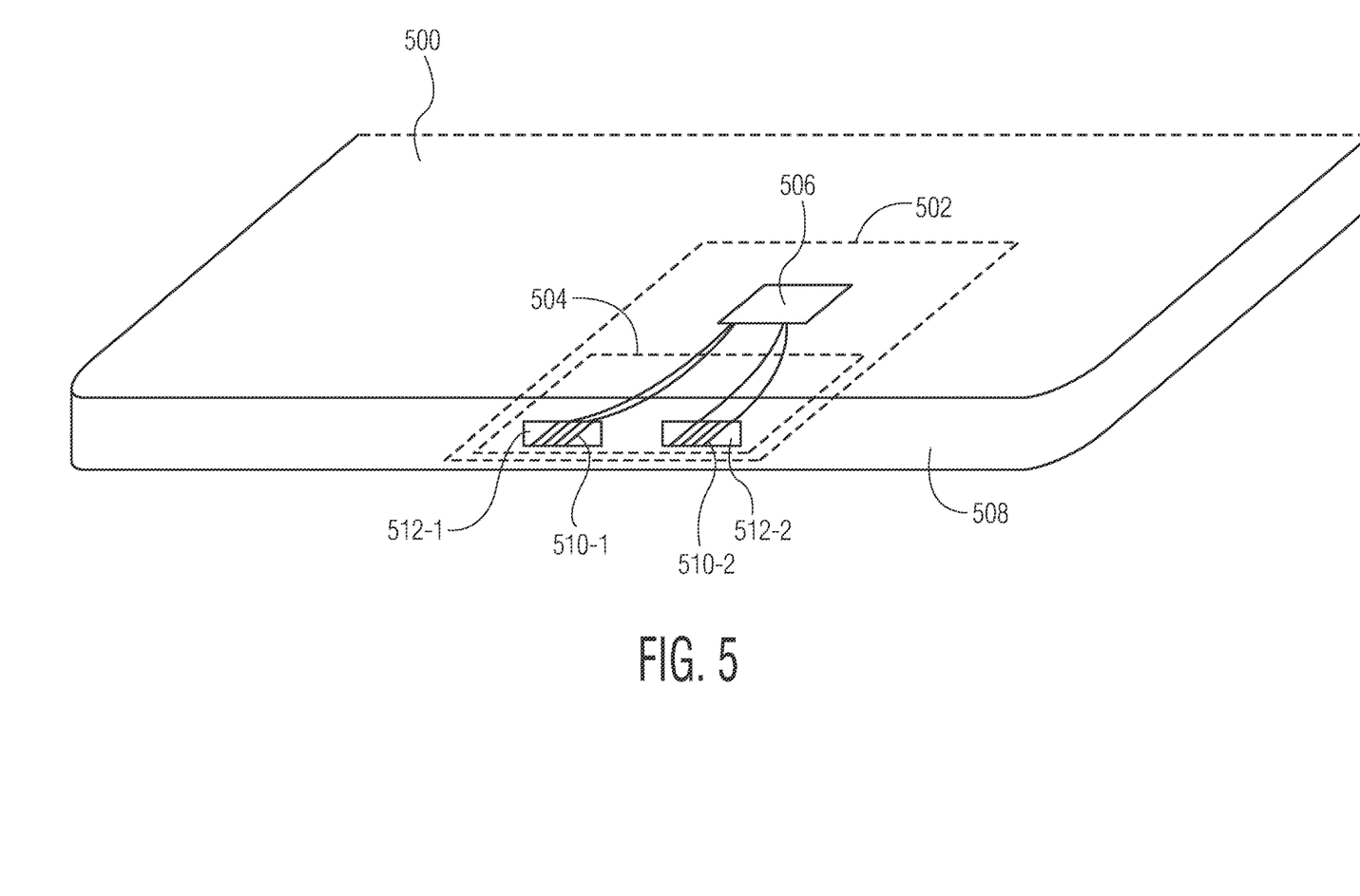
FIG. 5 depicts an isometric view of a system in a device.

FIG. 5 depicts an isometric view of a system 502 in a device 500. In the embodiment of FIG. 5, the system 502 includes an antenna system 504 and a transmit circuit 506 as described with reference to FIG. 2A and FIG. 2B, and the device 500 includes a housing frame 508. The antenna system 504 includes a first coil 510-1 wrapped around a first ferrite element 512-1 and a second coil 510-2 wrapped around a second ferrite element 512-2.

The transmit circuit 506 is positioned within the housing frame 508 of the device 500. The first coil 510-1 wrapped around the first ferrite element 512-1 and the second coil 510-2 wrapped around the second ferrite element 512-2 are positioned along an outer surface of the housing frame 508. As an example, the coils 510-1, 510-2, and the ferrite elements 512-1, 512-2 are positioned along the peripheral of the housing frame 508. Although the transmit circuit 506 and the antenna system 504 are described as having a certain arrangement relative to the device 500, the transmit circuit and the antenna system are not limited to the arrangement shown.

Figure 6:
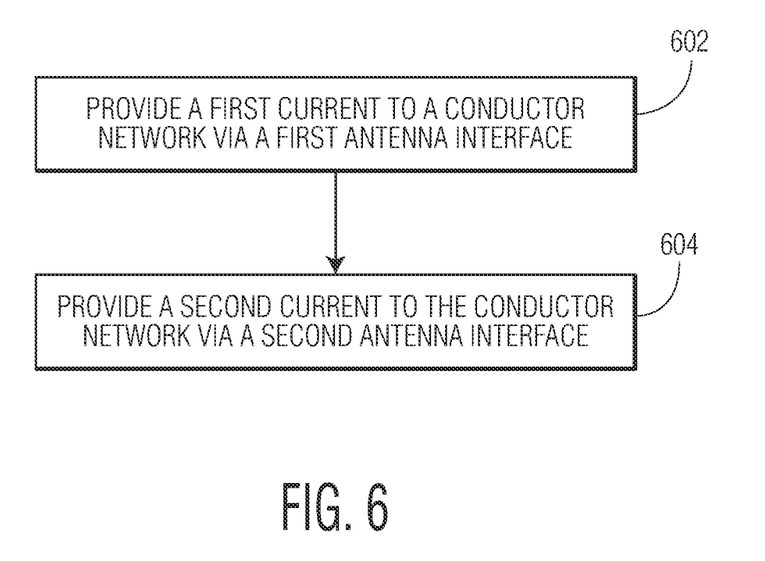
FIG. 6 is a flowchart of a method for operating an antenna system.

FIG. 6 is a flowchart of a method for operating an antenna system. At block 602, a first current is provided to a conductor network via a first antenna interface. At block 604, a second current is provided to the conductor network via a second antenna interface. The conductor network electrically connects the first and second antenna interfaces to a first coil wrapped around a first ferrite element and to a second coil wrapped around a second ferrite element.

The preceding detailed description is merely illustrative in nature and is not intended to limit the embodiments of the subject matter or the application and uses of such embodiments. As used herein, the word "exemplary" means "serving as an example, instance, or illustration." Any implementation described herein as exemplary is not necessarily to be construed as preferred or advantageous over other implementations. Furthermore, there is no intention to be bound by any expressed or implied theory presented in the preceding technical field, background, or detailed description.

The connecting lines shown in the various figures contained herein are intended to represent exemplary functional relationships and/or physical couplings between the various elements. It should be noted that many alternative or additional functional relationships or physical connections may be present in an embodiment of the subject matter. In addition, certain terminology may also be used herein for the purpose of reference only, and thus are not intended to be limiting, and the terms "first", "second" and other such numerical terms referring to structures do not imply a sequence or order unless clearly indicated by the context.

The foregoing description refers to elements or features being "connected" or "coupled" together. As used herein, unless expressly stated otherwise, "connected" means that one element is directly joined to (or directly communicates with) another element, and not necessarily mechanically. Likewise, unless expressly stated otherwise, "coupled" means that one element is directly or indirectly joined to (or directly or indirectly communicates with, electrically or otherwise) another element, and not necessarily mechanically. Thus, although the schematic shown in the figures depict one exemplary arrangement of elements, additional intervening elements, devices, features, or components may be present in an embodiment of the depicted subject matter.

Although specific embodiments of the invention have been described and illustrated, the invention is not to be limited to the specific forms or arrangements of parts so described and illustrated. The scope of the invention is to be defined by the claims appended hereto and their equivalents.

What is claimed is:

1. An antenna system comprising:
    a first ferrite rod;
    a second ferrite rod aligned end-to-end along an axis with the first ferrite rod;
    a first coil wrapped around the first ferrite rod;
    a second coil wrapped around the second ferrite rod;
    a conductor network connected between the first coil and the second coil; and
    a transmitter coupled to provide a first current to the first coil and a second current to the second coil via the conductor network, wherein a first radio frequency (RF) field is generated in the first coil by the transmitter and a second RF field is generated in the second coil by the transmitter, the first and second RF fields being emitted in opposition to each other creating an increased field strength perpendicular to the axis between the first and second coils.

2. The antenna system of claim 1, wherein the conductor network includes:
   a first node that connects an inner end of the first coil and an inner end of the second coil; and
   a second node that connects an outer end of the first coil and an outer end of the second coil.

3. The antenna system of claim 1, wherein the conductor network includes:
   a first node that connects an outer end of the first coil and an inner end of the second coil; and
   a second node that connects an inner end of the first coil and an outer end of the second coil.

4. The antenna system of claim 1, wherein the first ferrite rod and the second ferrite rod are angled between 0 and 45 degrees relative to the axis.

5. The antenna system of claim 1, wherein:
   a first current is provided to the first coil;
   a second current is provided to the second coil; and
   wherein the first current and the second current flow in opposite directions.

6. The antenna system of claim 1, wherein:
   a first current is provided to the first coil;
   a second current is provided to the second coil; and
   wherein the first current and the second current flow in the same direction.

7. A system comprising:
   an antenna system including:
      a first elongated ferrite element;
      a second elongated ferrite element aligned end-to-end in a same axis with the first elongated ferrite element;
      a first coil wrapped around the first elongated ferrite element;
      a second coil wrapped around the second elongated ferrite element;
      a conductor network connected between the first coil and the second coil; and
   a transmit circuit connected to the conductor network, wherein the transmit circuit is configured to provide a first current to the first coil and a second current to the second coil, wherein a first radio frequency (RF) field is generated in the first coil by the transmit circuit and a second RF field is generated in the second coil by the transmitter, the first and second RF fields being emitted in opposition to each other creating an increased field strength perpendicular to the axis between the first and second coils.

8. The system of claim 7, wherein the conductor network includes:
   a first node that connects an inner end of the first coil and an inner end of the second coil; and
   a second node that connects an outer end of the first coil and an outer end of the second coil.

9. The system of claim 7, wherein the conductor network includes:
   a first node that connects an outer end of the first coil and an inner end of the second coil; and
   a second node that connects an inner end of the first coil and an outer end of the second coil.

10. The system of claim 7, wherein the first elongated ferrite element and the second elongated ferrite element are angled between 0 and 45 degrees relative to the axis.

11. The system of claim 7, wherein the first current and the second current flow in opposite directions.

12. The system of claim 7, wherein the first current and the second current flow in the same direction.

13. A method for operating an antenna system, the method comprising:
   providing a first current to a conductor network via a first antenna interface;
   providing a second current to the conductor network via a second antenna interface; and
   wherein the conductor network electrically connects the first and second antenna interfaces to a first coil wrapped around a first ferrite element and to a second coil wrapped around a second ferrite element, wherein the first and second ferrite elements are aligned end-to-end in a same axis, wherein a first radio frequency (RF) field is generated in the first coil by the transmit circuit and a second RF field is generated in the second coil by the transmitter, the first and second RF fields being emitted in opposition to each other creating an increased field strength perpendicular to the axis between the first and second first and second coils.

* * * * *